(12) United States Patent
Candelore et al.

(10) Patent No.: US 11,762,458 B2
(45) Date of Patent: Sep. 19, 2023

(54) MEDIA DISPLAY DEVICE CONTROL BASED ON EYE GAZE

(71) Applicant: SONY GROUP CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/175,881

(22) Filed: Feb. 15, 2021

(65) Prior Publication Data

US 2022/0261069 A1    Aug. 18, 2022

(51) Int. Cl.
*G06F 3/0482* (2013.01)
*G06F 3/01* (2006.01)
*G06F 3/04847* (2022.01)

(52) U.S. Cl.
CPC .......... *G06F 3/013* (2013.01); *G06F 3/0482* (2013.01); *G06F 3/04847* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 6,421,067 B1* | 7/2002 | Kamen | ............... | H04N 21/4316 348/E5.103 |
| 8,436,948 B2* | 5/2013 | Yano | ................ | H04N 21/42222 348/14.05 |
| 9,024,894 B1* | 5/2015 | Smith | ................... | G06F 3/0488 345/173 |
| 9,632,648 B2* | 4/2017 | Lee | ..................... | H04N 21/4312 |
| 9,829,708 B1* | 11/2017 | Asada | ..................... | G06F 3/012 |
| 10,534,500 B1* | 1/2020 | Ledet | .................. | G06F 3/04842 |
| 2003/0035075 A1* | 2/2003 | Butler | ............ | H04N 21/440263 348/E5.103 |

(Continued)

OTHER PUBLICATIONS

Arjelle Pardes, "Comcast Now Lets You Control Your TV With Your Eyes", Wired.com, URL: https://www.wired.com/story/comcast-eye-tracking-tv-remote/?verso=true, Jun. 17, 2019, 04 pages.

(Continued)

*Primary Examiner* — Daniel Rodriguez
(74) *Attorney, Agent, or Firm* — CHIP LAW GROUP

(57) ABSTRACT

Provided is an electronic device that captures a first image of a user. The electronic device determines a position of eye gaze of the user on a first UI element of a plurality of UI elements displayed on a first display screen of the electronic device, based on the first image. The electronic device selects the first UI element based on a determination of the position of the eye gaze on the first UI element for a time interval. The electronic device transmits a first control signal to a media display device, based on the selection of the first UI element. The electronic device receives a feedback image from the media display device. The feedback image indicates control of the media display device based on the first control signal. The electronic device controls the first display screen to display the feedback image with the plurality of UI elements.

15 Claims, 9 Drawing Sheets

(56) References Cited

U.S. PATENT DOCUMENTS

| | | | |
|---|---|---|---|
| 2005/0076309 A1* | 4/2005 | Goldsmith | G06F 3/0482 715/825 |
| 2005/0199783 A1 | 9/2005 | Wenstrand et al. | |
| 2005/0210410 A1* | 9/2005 | Ohwa | G06F 3/0482 715/767 |
| 2007/0079258 A1* | 4/2007 | Hsieh | G06F 3/0482 715/853 |
| 2007/0118234 A1* | 5/2007 | Hsieh | G06F 3/0482 700/17 |
| 2007/0226654 A1* | 9/2007 | Hwang | G06F 3/0482 715/810 |
| 2007/0229465 A1* | 10/2007 | Sakai | H04B 1/202 345/173 |
| 2008/0165153 A1* | 7/2008 | Platzer | H04M 1/72448 345/173 |
| 2009/0177966 A1* | 7/2009 | Chaudhri | H04M 1/72427 715/716 |
| 2010/0275143 A1* | 10/2010 | Fu | G09G 5/397 715/768 |
| 2011/0087964 A1* | 4/2011 | Patterson | H04M 1/72427 715/716 |
| 2011/0138416 A1* | 6/2011 | Kang | H04N 21/42208 725/39 |
| 2011/0191516 A1* | 8/2011 | Xiong | G06F 13/14 345/173 |
| 2011/0267291 A1* | 11/2011 | Choi | H04N 21/4222 345/173 |
| 2012/0033140 A1* | 2/2012 | Xu | H04N 21/42224 348/734 |
| 2012/0081299 A1* | 4/2012 | Xiao | H04N 21/42208 345/173 |
| 2012/0089937 A1* | 4/2012 | Hsieh | G08C 17/02 715/773 |
| 2012/0089946 A1* | 4/2012 | Fukui | H04N 21/4222 715/822 |
| 2012/0139847 A1* | 6/2012 | Hunt | G06F 3/0484 345/173 |
| 2012/0162514 A1* | 6/2012 | Ryu | G06F 3/0481 348/E5.103 |
| 2012/0257035 A1* | 10/2012 | Larsen | G06F 3/017 348/78 |
| 2012/0293406 A1* | 11/2012 | Park | G06F 3/0485 345/156 |
| 2013/0002576 A1* | 1/2013 | Kim | G06F 3/017 345/173 |
| 2013/0019175 A1* | 1/2013 | Kotler | G06F 3/0482 715/728 |
| 2013/0215038 A1* | 8/2013 | Senanayake | G06F 3/041 345/169 |
| 2014/0019907 A1* | 1/2014 | Lin | G06F 3/0484 715/790 |
| 2014/0111420 A1* | 4/2014 | Ahn | G06F 3/0484 345/156 |
| 2014/0184550 A1* | 7/2014 | Hennessey | G06F 3/041 345/173 |
| 2014/0258942 A1* | 9/2014 | Kutliroff | G06F 3/013 715/863 |
| 2014/0267074 A1* | 9/2014 | Bal | G06F 9/451 345/173 |
| 2014/0380230 A1* | 12/2014 | Venable | G06F 3/013 715/781 |
| 2015/0009334 A1* | 1/2015 | Kwon | H04N 23/11 348/333.01 |
| 2015/0046433 A1* | 2/2015 | Lee | H04N 5/445 707/740 |
| 2015/0089371 A1* | 3/2015 | Zaslavsky | G06F 3/0482 715/716 |
| 2015/0145777 A1* | 5/2015 | He | G06V 10/141 348/78 |
| 2016/0014446 A1* | 1/2016 | Li | G06V 40/18 725/40 |
| 2016/0195924 A1* | 7/2016 | Weber | G06F 3/013 345/156 |
| 2016/0205427 A1* | 7/2016 | Yoon | G06F 3/017 725/34 |
| 2017/0103680 A1* | 4/2017 | Campbell | H04M 1/72475 |
| 2017/0104866 A1* | 4/2017 | Campbell | H04W 4/08 |
| 2017/0153701 A1* | 6/2017 | Mahon | G06F 3/0482 |
| 2017/0212583 A1* | 7/2017 | Krasadakis | G06F 3/0482 |
| 2018/0150204 A1* | 5/2018 | Macgillivray | G06F 3/04815 |
| 2018/0270442 A1* | 9/2018 | Park | H04N 21/43615 |
| 2018/0364881 A1* | 12/2018 | Lee | G06F 3/04886 |
| 2019/0033964 A1* | 1/2019 | Kulkarni | G06F 3/04842 |
| 2020/0220914 A1* | 7/2020 | Carrigan | H04N 21/43637 |
| 2020/0225747 A1* | 7/2020 | Bar-Zeev | G06T 7/74 |
| 2020/0250284 A1* | 8/2020 | Diehl | G06V 40/10 |
| 2021/0098112 A1* | 4/2021 | Gagnon | G16H 50/20 |

OTHER PUBLICATIONS

Katharine Schwab, "Comcast Unveils a Remote for Changing Channels with your Eyes", Fastcompany.com, URL: https://www.fastcompany.com/90364476/comcast-unveils-a-remote-for-changing-channels-with-your-eyes, Jun. 17, 2019, 05 pages.

* cited by examiner

MEDIA DISPLAY DEVICE CONTROL BASED ON EYE GAZE

REFERENCE

None.

FIELD

Various embodiments of the disclosure relate to control of a media display device based on eye gaze of a user. More specifically, various embodiments of the disclosure relate to an apparatus and a method for control of the media display device based on the eye gaze on an electronic device coupled to the media display device.

BACKGROUND

Recent advancements in the field of media content reproduction have led to development of various techniques to control media display devices (for example, televisions). Generally, a remote control may be utilized by a user to control functionalities of the media display devices, such as, to switch channels on the media display device, to control volume of the media display device, and so forth. In certain situations, the media display device may be accessed by a user with a physical disability such as a neurodevelopmental disorder, for example, a motor disorder. The user may experience difficulty in controlling the functionalities of the media display device, for example, via the remote control. Thus, the user may require assistance to control the media display device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method of control of a media display device via an electronic device based on eye gaze, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
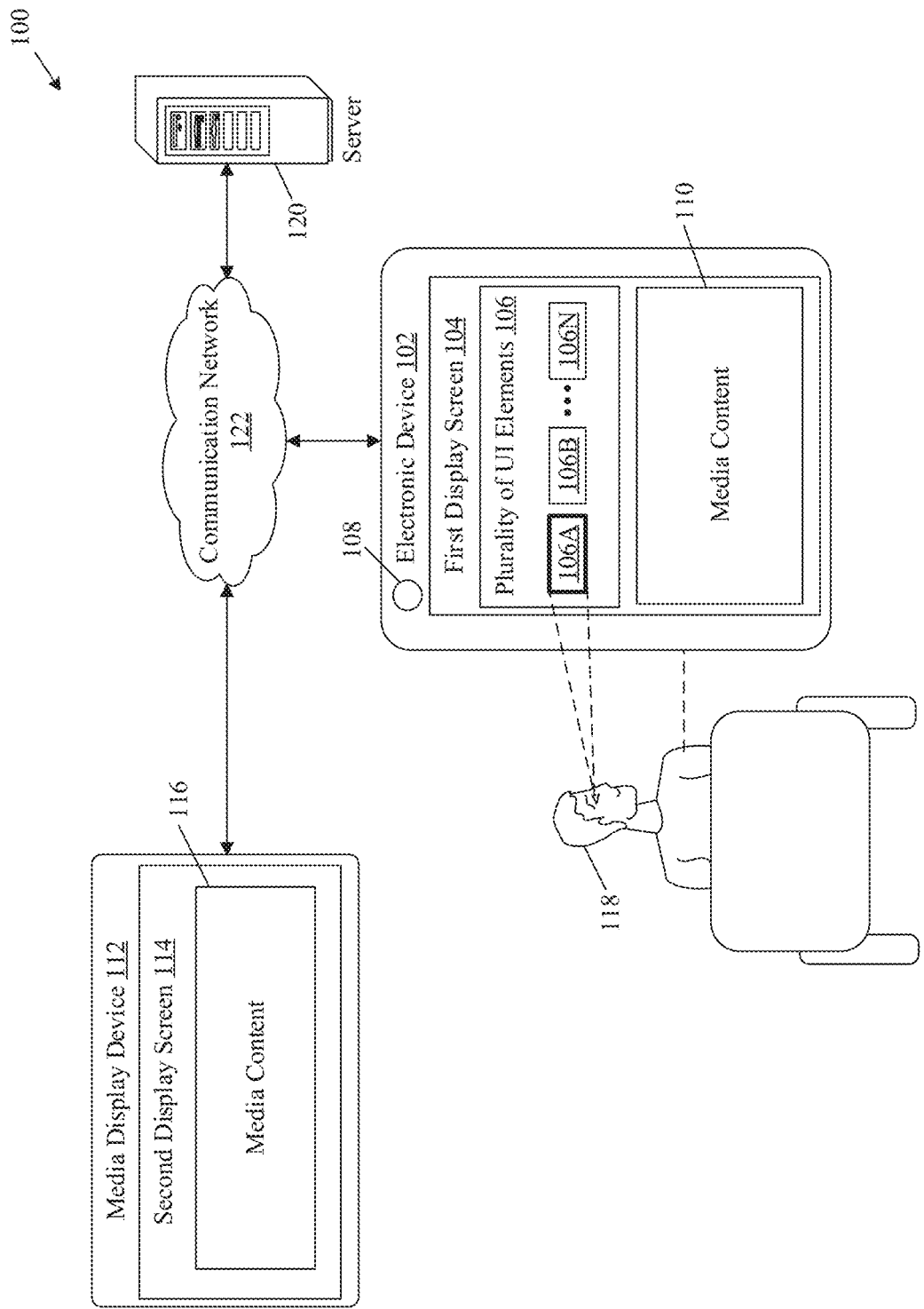
FIG. 1 is a block diagram that illustrates an exemplary network environment for control of a media display device based on eye gaze as a user input, in accordance with an embodiment of the disclosure.

The following described implementations may be found in the disclosed electronic device and method to control a media display device based on an eye gaze of a user as a user input. Exemplary aspects of the disclosure provide an electronic device (for example, an electronic tablet or a smart phone) accessible by a user (for example, a user with or without a physical disability). The electronic device may include a first display screen to display a plurality of user interface (UI) elements (for example, but not limited to, control icons such as a power control icon and volume control icons, navigation icons, or numeric icons). The electronic device may control a media display device (for example, a television) communicably coupled to the electronic device based on a selection of each of the plurality of UI elements by the user. The electronic device may be configured to control an image capturing device (for example, an in-built front camera of the electronic tablet) to capture a first image of the user of the electronic device. The first image of the user may include an image of at least a face of the first user. The electronic device may be configured to determine a position of an eye gaze of the user on a first UI element of the displayed plurality of UI elements, based on the captured first image of the user. The first UI element may be, for example, the control icon such as a "volume increase icon", which when selected, may increase a volume of a media content currently rendered on the media display device communicably coupled to the electronic device. The electronic device may further be configured to select the first UI element of the plurality of UI elements based on the determination of the position of the eye gaze on the first UI element for a time interval. For example, the time interval may be a few seconds (such as equal to or more than three seconds). In an example, the selection of the first UI element of the plurality of UI elements may be based on the eye gaze at the first UI element for the time interval of three seconds.

The electronic device may further be configured to transmit a first control signal to the media display device, based on the selection of the first UI element of the plurality of UI elements. The first control signal may correspond to an activation of a functionality (such as a volume increase) that may be associated with the media display device upon selection of the first UI element of the plurality of UI elements. In an example, the first control signal may correspond to a short distance radio wave signal indicative of increase in the volume of the media content rendered on the media display device, upon the selection of the first UI element such as the "volume increase icon". The electronic device may further be configured to receive a feedback image from the media display device, based on the transmitted first control signal. The received feedback image may indicate the control of the media display device based on the transmitted first control signal. In accordance with an embodiment, the received feedback image may correspond to the currently rendered media content and a UI icon that indicates an increase in the volume of the rendered media content displayed on the media display device. The electronic device may be further configured to control the first display screen to display the received feedback image with the displayed plurality of UI elements.

In an exemplary implementation, the electronic device may be placed at a position where the user may gaze at the plurality of UI elements of the electronic device to control the media display device. The electronic device may allow the user to select different UI elements of the plurality of UI elements on the electronic device to control different functionalities associated with the media display device. The electronic device of the present disclosure may provide the user (for example, the user with or without a physical disability) with the capability to control the media display device based on the eye gaze as the user input. The electronic device therefore allows the user to control the media display device based on the eye gaze, and thus, allows the user to control the media display device without any assistance from another user.

Further, the electronic device may concurrently display the plurality of UI elements and the received feedback image that may include a portion of the media content. In some embodiments, the feedback image may also include the UI icon corresponding to the selected first UI element. The concurrent display of the feedback image and the plurality of UI elements on the electronic device may allow the user to focus the eye gaze on the selected first UI element while viewing the media content and/or the UI icon, thereby eliminating a need to switch the position of eye gaze between the electronic device and the media display device while controlling the media display device, via the electronic device. The disclosed electronic device thus allows the user (for example with physical disability) to control the media display device, while continuing to view the media content on the electronic device, by concurrent display of the feedback image (corresponding to currently rendered portion of the media content) and the plurality of UI elements on the electronic device.

Further, the disclosed electronic device may control the media display device using short distance radio wave signal or using a wireless local network, to thereby allow the user to control the media display device without any requirement of a connection of the electronic device to an external network (for example, the internet).

FIG. 1 is a block diagram that illustrates an exemplary network environment for control of a media display device based on eye gaze as a user input, in accordance with an embodiment of the disclosure. With reference to FIG. 1, there is shown a network environment 100. The network environment 100 may include an electronic device 102. The electronic device 102 may include a first display screen 104 and an image capturing device 108. The first display screen 104 may display a plurality of UI elements 106 and a feedback image 110. The plurality of UI elements 106 may include a first UI element 106A, a second UI element 106B, and an Nth UI element 106N. The network environment 100 may further include a media display device 112. The media display device 112 may include a second display screen 114. The second display screen 114 may render a media content 116. The network environment 100 may further include a user 118, a server 120, and a communication network 122. The electronic device 102, the media display device 112, and the server 120 may be communicably coupled to each other, via the communication network 122. In some scenarios, the user 118 may be for example, a user with a physical disability, such as a user with neurodevelopmental disorders (for example, a motor disorder), who may require a wheelchair for physical movement. In such a scenario, the electronic device 102 may be mounted on a hand-rest of the wheelchair and/or a piece of furniture in a field of view of the user 118 to control the media display device 112, via the electronic device 102.

The electronic device 102 may include suitable logic, circuitry, and interfaces that may be configured to control the media display device 112. The electronic device 102 may be further configured to control the media display device 112 by utilization of the eye gaze of the user 118 as the user input. Examples of the electronic device 102 may include, but are not limited to, an electronic tablet, a smartphone, a computing device, a cellular phone, a mobile phone, a gaming device, a mainframe machine, a server, a computer work-station, and/or a consumer electronic (CE) device. It may be noted that a shape and an arrangement of the electronic device 102 as shown in FIG. 1 is presented merely as an example. The present disclosure may be also applicable to other shapes and arrangements of the electronic device 102, without deviation from the scope of the disclosure.

The first display screen 104 may include suitable logic, circuitry, and interfaces that may be configured to display the plurality of UI elements 106 and the feedback image 110. The first display screen 104 of the electronic device 102 may be configured to receive the user input in form of the eye gaze of the user 118. Further, the first display screen 104 may be a touch screen which may enable the user 118 to provide the user input in the form of touch input via the first display screen 104. The touch screen may be at least one of a resistive touch screen, a capacitive touch screen, or a thermal touch screen. The first display screen 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the first display screen 104 may refer to a display screen of a head mounted device (HMD), a smart-glass device, a see-through display, a projection-based display, an electro-chromic display, or a transparent display.

The plurality of UI elements 106 may correspond to control icons (for example, user-selectable options) for the control of the media display device 112. For example, each of the plurality of UI elements 106 may represent a user-selectable icon, such as control icons of a remote control which may be used to control the media display device 112 (such as a television). The plurality of UI elements 106 may be configured to allow the user 118 to control the different functionalities associated with the media display device 112 via selection of the plurality of UI elements 106 based on the eye gaze of the user 118. Examples of the plurality of UI elements 106 may include, but are not limited to, the control icons corresponding to a power setting of the media display device 112, a home screen setting on the media display device 112, audio settings (such as volume control settings) of the media content rendered on the media display device 112, video display settings (such as display characteristics adjustment, video mode selection) of the media content rendered on the media display device 112, a network setting of the media display device 112, a security setting of the media display device 112, or an accessibility setting of the media display device 112. In accordance with an embodiment, the home screen setting on the media display device 112 may correspond to a preference related to an arrangement of menus or icons on a home screen of the media display device 112. Further, the security setting may include, but is not limited to, a user-privacy setting, parental control setting, and a user account setting of media display device 112. In addition, the accessibility settings may include, but is not limited to, a voice guide setting, a voice-based scene description setting, a closed caption setting, video description setting, and a color inversion setting of the media display device 112.

The image capturing device 108 may comprise suitable logic, circuitry, interfaces, and/or code that may be configured to capture one or more images of the users, such as the user 118. In accordance with an embodiment, the image capturing device 108 may capture the one or more images that may include at least a face of the user 118 to determine a position of the eye gaze of the user 118 on the first UI element of the plurality of UI elements 106. Examples of the image capturing device 108 may include, but are not limited to, an image sensor, a wide-angle camera, a 360-degree camera, an action camera, a closed-circuit television (CCTV) camera, a camcorder, a digital camera, camera phones, a time-of-flight camera (ToF camera), a night-vision camera, and/or other image capture devices. Although in FIG. 1, the image capturing device 108 is shown integrated with the electronic device 102, the disclosure is not so limited. In some embodiments, the image capturing device 108 may be separated from the electronic device 102, without a deviation from the scope of the disclosure.

The media display device 112 may comprise suitable logic, circuitry, interfaces, and/or code that may be configured to render the media content as per viewer's preferences (for example, preferences of the user 118). In an example, the media display device 112 may be configured to communicate with the server 120 to receive the media content. In another example, the media display device 112 may be configured to receive broadcast content or streaming content as the media content. In accordance with an embodiment, the media display device 112 may be further configured to store the media content received from the server 120. The media display device 112 may be further configured to receive the first control signal, via the electronic device 102 for the control of the media display device 112 based on the plurality of UI elements 106, which are selected based on the eye gaze of the user 118 as the user input. Examples of the media display device 112 may include, but are not limited to, a television, a laptop, a personal computer, a mobile phone, a smart phone, a tablet computing device, a gaming console, a media player, a sound system with display capabilities, a home theatre system, a digital camera, an automotive electronic device, an electronic musical instrument, or other consumer electronic device with media rendering capability. It may be noted that a shape and an arrangement of the media display device 112 as shown in FIG. 1 is presented merely as an example. The present disclosure may be also applicable to other shapes and arrangements of the media display device 112, without deviation from the scope of the disclosure.

The second display screen 114 may include suitable logic, circuitry, and interfaces that may be configured to display the media content. The second display screen 114 may be realized through several known technologies such as, but not limited to, at least one of an LCD display, an LED display, a plasma display, or an OLED display technology, or other display devices. In accordance with an embodiment, the second display screen 114 may refer to a display screen of a smart-glass device, a see-through display, a projection-based display, an electro-chromic display, or a transparent display. In accordance with an embodiment, the second display screen 114 may be a touch screen which may enable the user 118 to provide the user input in form of touch via the second display screen 114. The touch screen may be at least one of a resistive touch screen, a capacitive touch screen, or a thermal touch screen.

The rendered media content 116 may correspond to a currently rendered content on the second display screen 114 of the media display device 112. Examples of the media content 116 may include, but is not limited to, the home screen of the media display device 112, a home screen of an application rendered on the media display device 112, image content, video content (for example, a video recording, broadcast content, streaming content) rendered on the media display device 112, a gaming application interface, or device settings interface of the media display device 112.

The feedback image 110 of the electronic device 102 may correspond to a duplicate image of a portion of the currently rendered media content 116 on the media display device 112. In some embodiments, the feedback image 110 may correspond to an image of a UI icon displayed on the second display screen 114 that may be indicative of the selection of any of the plurality of UI elements 106. In one embodiment, the feedback image 110 may be a set of images (for example, a video stream) of the media content 116 received from the media display device 112. In an exemplary scenario, the feedback image 110 may correspond to a movie being currently rendered on the second display screen 114 of the media display device 112 along with the UI icon that may indicate the increase in the volume of the rendered media content (for example, the movie) displayed on the media display device 112.

The server 120 may comprise suitable logic, circuitry, interfaces, and/or code that may be configured to communicate with the media display device 112 via the communication network 122. The server 120 may be configured to store the media content for distribution to the media display device 112. The server 120 may receive a content request from the media display device 112, and may provide the stored media content to the media display device 112 based on the received content request. Examples of the server 120 may include, but are not limited to, an application server, a media content server, a cloud server, a mainframe server, a database server, a file server, a web server, or other types of servers.

The communication network 122 may include a wireless communication channel through which the media display device 112, the electronic device 102 and the server 120 may communicate with each other, in a wireless manner. Examples of the communication network 122 may include, but are not limited to, short range communication technologies, such as a Wireless Fidelity (Wi-Fi) network, a near field communication (NFC) channel, or a Bluetooth® (BT) communication network. Various entities in the network environment 100, such as the electronic device 102 may be configured to connect to the communication network 122, in accordance with various wireless communication protocols. Examples of such wireless communication protocols may include, but are not limited to, at least one of wireless device-to-device communication protocols, or Bluetooth® communication protocols. In some embodiments, the communication network 122 may include a communication medium through which the media display device 112 and the server 120 may communicate with each other. Examples of wired and wireless communication protocols of the communication network 122 through which the media display device 112 and the server 120 may communicate may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication and wireless access point (AP).

In operation, the electronic device 102 may be configured to display a plurality of user interface (UI) elements to control different functionalities of the media display device 112. The electronic device 102 may be configured to control the image capturing device 108 to capture the first image of the user 118 of the electronic device 102. The first image may include at least the image of the face of the user 118 in order to track the eye gaze of the user 118. In some embodiments, the electronic device 102 may be mounted on the wheelchair of the user (such as the user 118 with physical disability), and may control the image capturing device 108 to capture the first image of the user 118. The electronic device 102 may be further configured to determine the position of the eye gaze of the user 118 on the first UI element 106A of the displayed plurality of UI elements 106, based on the captured first image of the user 118. The details of the determination of the position of the eye gaze of the user 118 on the first UI element 106A of the displayed plurality of UI elements 106 are further described, for example, in FIG. 3A. In accordance with an embodiment, each UI element of the plurality of UI elements 106 may be associated with a different functionality associated with the media display device 112. The electronic device 102 may be further configured to select the first UI element 106A of the plurality of UI elements 106 based on the determination of the position of the eye gaze on the first UI element 106A for a time interval. The time interval may be preset, for example, in a range of a few seconds (such as 3 to 5 seconds), or may be set based on user input. In an exemplary embodiment, the selection of the first UI element 106A may be based on other eye gestures, for example, blinking of the eyes of the user 118, or the eye gaze followed by the blinking. Thus, the electronic device 102 may determine the blinking of the eye of the user 118 at the determined position of the eye gaze on the first UI element 106A as the user input to select the first UI element 106A. In an example, the first UI element 106A may correspond to a "move up" navigation icon that may be used to navigate through different icons (for example, settings icon, applications icon, games icon) of the home screen of the media display device 112.

The electronic device 102 may be further configured to transmit the first control signal to the media display device 112, based on the selection of the first UI element 106A of the plurality of UI elements 106. For example, the transmitted first control signal may enable navigation between UI icons. Details of the navigation between UI icons based on the selection of the first UI element 106A are provided, for example, at FIG. 3B. The electronic device 102 may be further configured to receive the feedback image 110 from the media display device 112, based on the transmitted first control signal. In an exemplary embodiment, the feedback image 110 may be an image of the home screen of the media display device 112 that shows the selection of an UI icon of the home screen of the media display device 112. The electronic device 102 may be further configured to control the first display screen 104 to display the received feedback image 110 with the displayed plurality of UI elements 106. Therefore, the electronic device 102 may allow the user 118 to control the media display device 112 via the eye gaze as the user input provided to the electronic device 102. The control of the media display device 112 via the eye gaze of the user 118 allows the user 118 to view and control different functionalities of the media display device 112 without the assistance from other users. The electronic device 102 may be further configured to control the first display screen 104 to display at least a portion of the media content 116, being played on the media display device 112, as part of the received feedback image 110. Therefore, the electronic device 102 may allow the user 118 to control the media display device 112 while being able to continuously view the media content 116. As a result, the user 118 does not miss a frame or a portion of the media content 116 played on the media display device 112 (such as a television), during the provision of the user input to control the media display device 112. Thus, a seamless viewing experience may be achieved for the user 118.

In accordance with an embodiment, the electronic device 102 may be configured to control a movement of a cursor on the plurality of UI elements 106 of the electronic device 102 corresponding to a change in the position of the eye gaze of the user 118 on the plurality of UI elements 106. For example, the electronic device 102 may move the cursor to the first UI element 106A, upon determination of the position of the eye gaze of the user 118 on the first UI element 106A and further move the cursor to the second UI element 106B, upon determination of the position of the eye gaze of the user 118 on the second UI element 106B. In some embodiments, the electronic device 102 may be configured to highlight the first UI element 106A based on the selection of the first UI element 106A of the plurality of UI elements 106 by the user 118. Details of the movement of the cursor and highlight of the first UI element 106A are further described, for example, in FIG. 3B.

In accordance with an embodiment, the feedback image 110 received from the media display device 112 may correspond to the UI icon to indicate the control of the media display device 112 based on the transmitted first control signal. Examples of the UI icon may include, but are not limited to, a "volume up" icon, a "volume down" icon, a "brightness control" icon, or a "mode selection" icon. Details of the receipt of the UI icon as the feedback image 110 are further described, for example, in FIGS. 3A, 3B, 4A, 4B, 5A, and 5B.

In accordance with an embodiment, the electronic device 102 may be further configured to control the first display screen 104 to display the plurality of UI elements 106 on a first portion of the first display screen 104, and display the received feedback image 110 on a second portion of the first display screen 104. The details of the display the plurality of UI elements 106 on the first portion and the received feedback image 110 on the second portion of the first display screen 104 are further described, for example, in FIGS. 3A, 3B, 4A, 4B, 5A, and 5B.

In accordance with an embodiment, the feedback image 110 received from the media display device 112 may correspond to the media content 116 displayed on the second display screen 114 of the media display device 112 based on the transmitted first control signal. The details of the receipt of the media content 116 (or a portion of the media content 116) as the feedback image 110 are further described, for example, in FIGS. 3A, 3B, 4A, 4B, 5A, and 5B.

In accordance with an embodiment, the electronic device 102 may be further configured to control an overlay of the displayed plurality of UI elements 106 on the displayed feedback image 110 that may correspond to the media content 116 displayed on the second display screen 114 of the media display device 112. Furthermore, the electronic device 102 may be configured to control an opacity level of the displayed plurality of UI elements 106 that are overlaid on the displayed feedback image 110, such that the user 118 may easily view the rendered media content 116 during control of the media display device 112, on the electronic device 102. The details of the plurality of UI elements 106 that are overlaid on the displayed feedback image 110 and the control of the opacity level of the displayed plurality of UI elements 106 are further described, for example, in FIG. 4A.

In accordance with an embodiment, the electronic device 102 may be further configured to control the first display screen 104 to display information, related to the media content 116 displayed on the second display screen 114 of the media display device 112, based on a selection of one or more UI elements of the plurality of UI elements 106. For example, the display information may correspond to a short description of the media content 116 being rendered on the media display device 112. The details of the control the first display screen 104 to display information related to the media content 116 are further described, for example, in FIG. 4B.

In accordance with an embodiment, the electronic device 102 may be further configured to render guidance information for the user 118, to control one or more configuration settings of the media display device 112 through one or more UI elements of the plurality of UI elements 106 displayed on the first display screen 104. In an exemplary embodiment, the guidance information for the user 118 may be, for example, information on the operation associated with one or more UI elements of the plurality of UI elements 106. The details of the guidance information for the user 118 are further described, for example, in FIG. 5A.

In accordance with an embodiment, the electronic device 102 may be further configured to control the first display screen 104 to display a set of UI elements of the plurality of UI elements 106 on the first display screen 104, based on the received feedback image 110. In an example, the set of UI elements of the plurality of UI elements 106 may be associated with control settings of the media content 116 of the media display device 112. The details of the display of the set of UI elements are further described, for example, in FIG. 5B.

Figure 2:
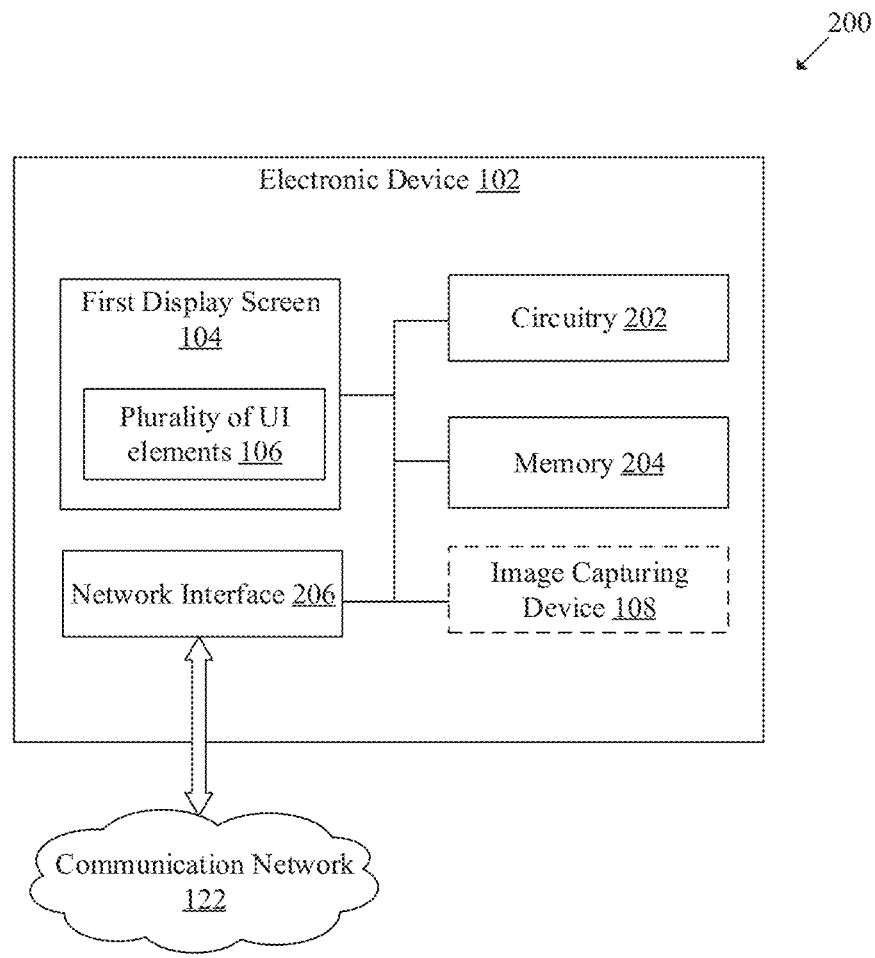
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. With reference to FIG. 2, there is shown a block diagram 200 of the electronic device 102. The electronic device 102 may include circuitry 202, a memory 204, and a network interface 206. The electronic device 102 may further include the first display screen 104. The first display screen 104 may display the plurality of UI elements 106. The electronic device 102 may further include the image capturing device 108. The detailed description of the first display screen 104, the image capturing device 108, and the communication network 122 has been made with reference to FIG. 1, and has been omitted here for the sake of brevity.

The circuitry 202 may include suitable logic, circuitry, and/or interfaces, that may be configured to execute program instructions associated with different operations to be executed by the electronic device 102. For example, some of the operations may include the determination of the position of the eye gaze of the user 118 on the first UI element 106A, the selection of the first UI element 106A based on the determination of the position of the eye gaze of the user 118, the transmission of the first control signal to the media display device 112, the reception of a feedback image from the media display device 112, and the control of the first display screen 104 to display the feedback image 110 with the plurality of UI elements 106. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store information corresponding to the functionalities associated with each of the UI element of the plurality of UI elements 106. In some embodiments, the memory 204 may be configured to store the user input associated with the user 118. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and/or interfaces that may be configured to facilitate communication between the media display device 112 and the electronic device 102 via the communication network 122. The network interface 206 may be implemented by use of various known technologies to support wired or wireless communication of the electronic device 102 with the communication network 122. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

A person of ordinary skill in the art will understand that the electronic device 102 in FIG. 2 may also include other suitable components or systems, in addition to the components or systems which are illustrated herein to describe and explain the function and operation of the present disclosure. A detailed description for the other components or systems of the electronic device 102 has been omitted from the disclosure for the sake of brevity. The operations of the circuitry 202 are further described, for example, in FIGS. 3A, 3B, 4A, 4B, 5A, and 5B.

Figure 3A:
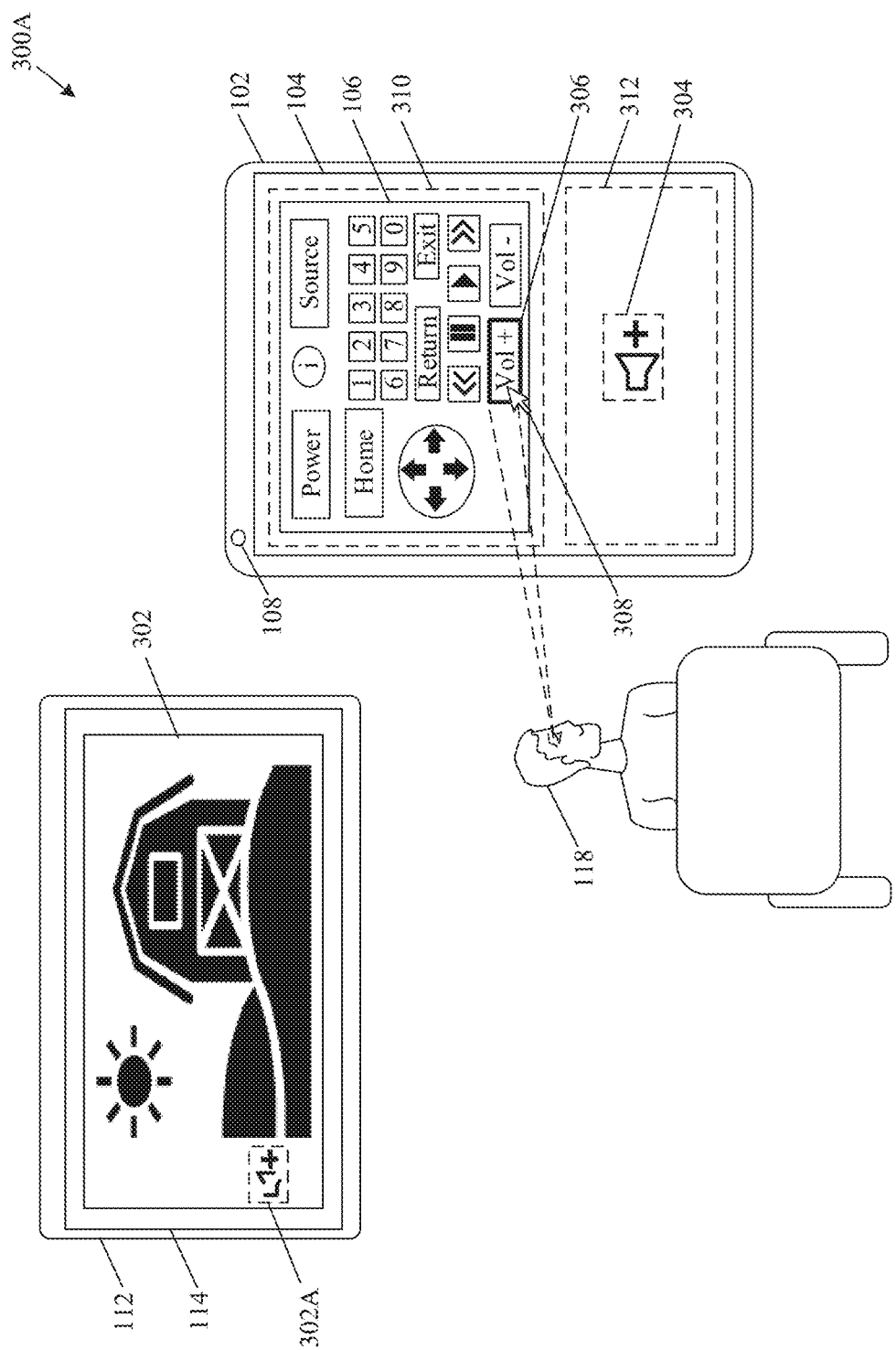
FIGS. 3A and 3B are diagrams which collectively illustrate exemplary scenarios for control of the media display device of FIG. 1, in accordance with an embodiment of the disclosure.
Figure 3B:
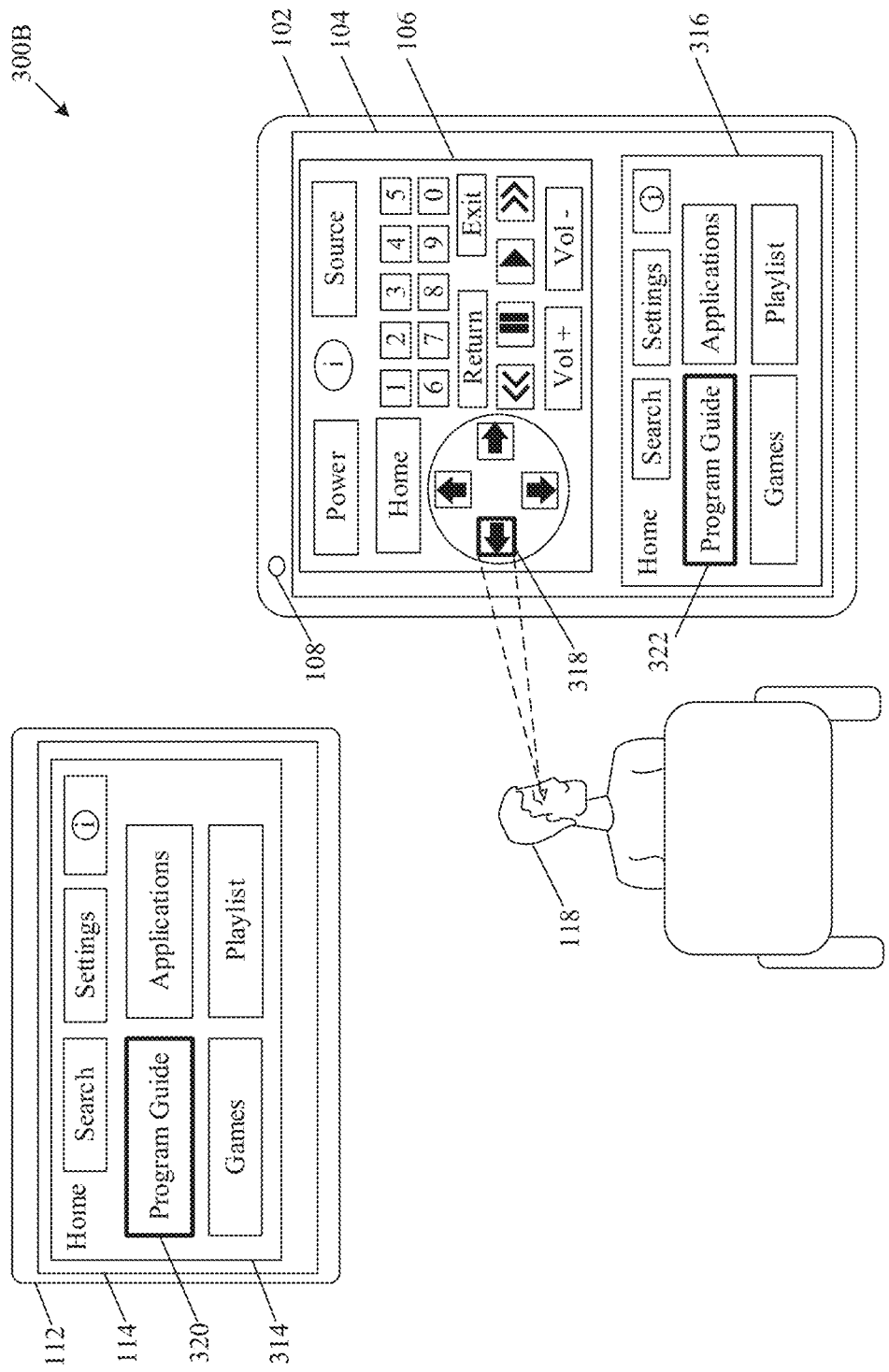

FIGS. 3A and 3B are diagrams which collectively illustrate exemplary scenarios for control of the media display device 112 of FIG. 1, in accordance with an embodiment of the disclosure. FIGS. 3A and 3B are explained in conjunction with elements from FIGS. 1 and 2. With reference to FIG. 3A, there is shown an exemplary scenario 300A that includes the electronic device 102 (for example, the electronic tablet or smartphone), the first display screen 104, the plurality of UI elements 106, the image capturing device 108 (for example, the in-built front camera), the media display device 112 (for example, the television), the second display screen 114, and the user 118 of FIG. 1. Furthermore, in the exemplary scenario 300A, there is further shown a first UI element 306 (such as a "volume up" UI element) among the plurality of UI elements 106 (for example, "volume control" UI elements, "power" UI element, "source" UI element, "playback control" UI elements, "navigation" UI elements, "home" UI element, "numeric" UI elements, "information" UI element, "return" UI element, and "exit" UI element). In the exemplary scenario 300A there is further shown a received feedback image 304, a cursor 308, a first portion 310 of the first display screen 104, and a second portion 312 of the first display screen 104. Furthermore, there is further shown a media content 302 and a "volume up" UI icon 302a on the second display screen 114 of the media display device 112.

With respect to FIG. 3A, the media display device 112 may be configured to render the media content 302, such as, a movie on the second display screen 114. In an exemplary embodiment, the user 118 may need to increase a volume of the media content 302 rendered on the media display device 112. In such a case, the user 118 may gaze towards the plurality of UI elements 106 of the electronic device 102 to select the first UI element 306 (such as the "volume up" UI element) to increase the volume of the media content 302 rendered on the media display device 112. The circuitry 202 of the electronic device 102 may be configured to control the image capturing device 108 to capture a first image of the user 118. The image capturing device 108 may capture the first image of the user 118 based on a field of view (FOV) of the image capturing device 108. The FOV of the image capturing device 108 may be predefined such that the first image of the user 118 (or image of the face of the user 118) may be captured accurately. The electronic device 102 may be positioned in such a manner that the image capturing device 108 may clearly capture the first image of the face of the user 118. For example, the electronic device 102 may be mounted near the user 118 or may be present in a hand of the user 118. In another example, the electronic device 102 may be mounted on the wheelchair (such as on a hand-rest or armrest of the wheelchair) of the user 118. It may be noted that the mounting location or position of the electronic device 102 on which the image capturing device 108 is disposed, as shown in FIG. 3A, is presented merely as an example. The image capturing device 108 may be disposed on other positions, location or surfaces of the electronic device 102 without deviation from the scope of the disclosure, such that the FOV of the image capturing device 108 may capture the first image of the user 118 clearly. Other positions, locations, or surfaces of the electronic device 102 at which the image capturing device 108 may be disposed are omitted from the disclosure for the sake of brevity.

The circuitry 202 of the electronic device 102 may be further configured to extract an image portion from the captured first image of the face of the user 118. The image portion may indicate eyes of the face of the user 118. The circuitry 202 may extract the image portion (e.g. which may include sub-image or pixels for the eyes) from the captured first image based on different image processing techniques, known in the art. The circuitry 202 may be further configured to track the movement of the eyes of the user 118 based on the extracted image portion. In some embodiments, the circuitry 202 may control the image capturing device 108 over a period of time to capture multiple images of the face of the user 118 and further track the movement of the eyes of the user 118 based on analysis of the image portion in each of the captured multiple images. The movement of the eyes may indicate where the user 118 might be gazing (for example, towards the electronic device 102 or elsewhere).

The circuitry 202 of the electronic device 102 may be further configured to determine the position of the eye gaze of the user 118 on the first UI element 306 (such as the "volume up" UI element) of the plurality of UI elements 106 of the electronic device 102, based on the tracked movement of the eyes of the user 118. In some embodiments, the circuitry 202 may determine the position of the eye gaze on any UI element of the plurality of UI elements 106 of the electronic device 102 based on the captured first image.

In accordance with an embodiment, the circuitry 202 may further control a movement of the cursor 308 on the plurality of UI elements 106 corresponding to the change in the position of the eye gaze of the user 118 on the plurality of UI elements 106. The circuitry may control the movement of the cursor 308 to a UI element at which the user 118 may be currently looking, as the eye gaze of the user 118 moves to different positions on the first portion 310 of the first display screen 104 corresponding to different UI elements of the plurality of UI elements 106. For example, the circuitry 202 may locate the cursor 308 at a "move up" navigation UI element when the circuitry 202 determines that the eye gaze of the user 118 is on the "move up" navigation UI element. Further, the circuitry 202 may move the cursor 308 to the "volume up" UI element 306, when the circuitry 202 determines that the eye gaze of the user 118 is on the first UI element 306 (such as the "volume up" UI element). The movement of the cursor 308 on the plurality of UI elements 106 may help the user 118 to visually confirm the position of the eye gaze of the user 118 on the electronic device 102.

The circuitry 202 of the electronic device 102 may further select the first UI element 306 (such as the "volume up" UI element) upon determination of the eye gaze of the user 118 on the first UI element 306 (such as the "volume up" UI element) for a certain time interval (such as for a few seconds). In an exemplary implementation, the circuitry 202 may select the first UI element 306 (such as a "volume up" UI element) of the plurality of UI elements 106 based on other eye gestures. For example, the circuitry 202 may be configured to select the "volume up" UI element 306 based on a detection of "blinking" of the eyes by the user 118 while the eye gaze is determined to be on the first UI element 306 (such as the "volume up" UI element). In some embodiments, the circuitry 202 may be configured to determine at least one of a facial expression of the user 118 (for example, a smile) or a gesture associated with a head (for example, tilt of the head of the user 118 in a direction) of the user 118, as the user input to select the first UI element 306 (such as the "volume up" UI element) of the plurality of UI elements 106 displayed on the first display screen 104.

In accordance with an embodiment, the circuitry 202 may further highlight the first UI element 306 (such as the "volume up" UI element) as shown in FIG. 3A as a confirmation of the selection of the first UI element 306 (i.e. "volume up" UI element) from the plurality of UI elements 106. The highlighting of the first UI element 306 (i.e. "volume up" UI element) may help the user 118 to identify the selected first UI element 306. In one or more embodiments, the circuitry 202 may be configured to control (for example, increase) a size of the selected first UI element 306 (i.e. "volume up" UI element) for ease of viewing of the selected UI icon for the user 118. In an example, the circuitry 202 may be further configured to display the selected first UI element 306 as a "pop up" UI element on the first display screen 104.

The circuitry 202 may be further configured to transmit the first control signal to the media display device 112 based on the selection of the first UI element 306 (i.e. "volume up"

UI element) by the user 118. The circuitry 202 may be further configured to transmit the first control signal using a short distance radio wave signal (for example, Bluetooth) or using a wireless local network (for example, Wi-Fi Direct). The first control signal may cause the media display device 112 to increase the volume of the media content 302 rendered on the second display screen 114 of the media display device 112, when the first control signal (i.e. related to the "volume up" UI element) is received by the media display device 112 from the electronic device 102. Thus, the circuitry 202 may allow the user 118 to control the volume of the media content 302 rendered on the media display device 112, via the electronic device 102 by utilizing the eye gaze of the user 118.

As shown in FIG. 3A, the media display device 112 may display the "volume up" UI icon 302a on the second display screen 114 that may be indicative of the increase in the volume of the media content 302 rendered on the media display device 112 based on the user input. It may be noted that a position of the "volume up" UI icon 302a as shown in FIG. 3A, is presented merely as an example. The "volume up" UI icon 302a may be positioned on any portion of the second display screen 114 without deviation from the scope of the disclosure.

The circuitry 202 of the electronic device 102 may be further configured to receive the feedback image 304 from the media display device 112, based on the transmitted first control signal. The feedback image 304 may correspond to an image of the "volume up" UI icon 302a as displayed on the second display screen 114. For example, when the user 118 is gazing at the electronic device 102 to control the volume of the media content 302, the user 118 may need to switch the eye gaze between the electronic device 102 and the media display device 112 to confirm the change in the volume as indicated by the "volume up" UI icon 302a on the media display device 112. Thus, the circuitry 202 of the electronic device 102 may display the "volume up" UI icon 302a as the feedback image 304 on the electronic device 102, such that the user 118 may confirm the increase of the volume by the feedback image 304, without any requirement to switch the eye gaze back and forth between the electronic device 102 and the media display device 112 to confirm the increase in the volume.

The circuitry 202 may be further configured to control the first display screen 104 to display the received feedback image 304 along with the displayed plurality of UI elements 106. In accordance with an embodiment, the circuitry 202 may be further configured to control the first display screen 104 to display the plurality of UI elements 106 on the first portion 310 of the first display screen 104, and display the received feedback image 304 on the second portion 312 of the first display screen 104. The display of the plurality of UI elements 106 and the feedback image 304 on different portions, such as the first portion 310 and the second portion 312 respectively, may allow the user 118 to view an image of the UI icon, for example, the image of the "volume up" UI icon 302a while controlling the volume of the media content 302 rendered on the media display device 112. It may be noted here that a position of the feedback image 304 on the second portion 312 of the first display screen 104, as shown in FIG. 3A, is presented merely as an example. The feedback image 304 may be present at a different position on the second portion 312 of the first display screen 104 without deviating from the scope of the disclosure. Moreover, a size and a position of the first portion 310 and the second portion 312 of the first display screen 104 as shown in FIG. 3A, are presented merely as an example. The size and the position of the first portion 310 and the second portion 312 of the first display screen 104 may be presented in a different manner without deviation from the scope of the disclosure. For example, the first portion 310 may be present below the second portion 312 on the first display screen 104. The disclosed electronic device 102 may thus enable the user 118 to effectively control the media display device 112 based on the eye gaze as the user input without assistance from another user. The disclosed electronic device 102 may also enable the user 118 to effectively control the media display device 112 based on the eye gaze as the user input without requiring the electronic device 102 to connect to an external network (for example, the internet).

With reference to FIG. 3B, there is shown an exemplary scenario 300B. In the exemplary scenario 300B, there is shown a media content 314, a feedback image 316, a "move left" navigation UI element 318, a "program guide" UI icon 320, and a corresponding image 322 of the "program guide" UI icon 320.

The media display device 112 may display the home screen of the media display device 112 as the media content 314 on the second display screen 114 based on a user input of the user 118. The user 118 may need to navigate through a set of UI icons present on the home screen of the media display device 112. The set of UI icons may include for example, an "applications" UI icon, a "games" UI icon, a "playlist" UI icon, a "settings" UI icon, a "search" bar, an "information" icon, and so forth. Thus, the circuitry 202 of the electronic device 102 may determine the position of the eye gaze of the user 118 on the navigation UI elements of the plurality of UI elements 106. The circuitry 202 may determine the position of the eye gaze of the user 118 on the first UI element (i.e. "move left" navigation UI element 318) of the plurality of UI elements 106. The circuitry 202 may select the "move left" navigation UI element 318 based on the determination of the position of the eye gaze of the user 118 on the "move left" navigation UI element 318.

The circuitry 202 may further transmit the first control signal to the media display device 112 to navigate to a UI icon (on the second display screen 114) that may be present at a left side of a currently selected UI icon of the set of UI icons. For example, the first control signal may enable the selection of the "program guide" UI icon 320 by navigation from the "applications" UI icon of the set of UI icons present on a right side of the home screen to the "program guide" UI icon 320 present on a left side of the home screen.

The circuitry 202 may be further configured to receive the feedback image 316 based on the transmitted first control signal. The received feedback image 316 may correspond to an image associated with the media content 314 (for example, the home screen image shown in FIG. 3B) of the media display device 112. The feedback image 316 may depict the selection of the "program guide" UI icon 320 by highlighting the corresponding image 322 of the "program guide" UI icon 320. Thus, the electronic device 102 may enable the user 118 to efficiently navigate the set of UI icons of the media content 314 (for example, the home screen) without a need to switch the eye gaze back and forth between the electronic device 102 and the media display device 112. Therefore, the electronic device 102 may allow the user 118 to control the media display device 112 while being able to continuous view the media content 314. As a result, the user 118 does not miss a frame or a portion of the media content 314 played on the media display device 112 (such as a television), during the provision of the user input to control the media display device 112. Thus, a seamless viewing experience may be achieved for the user 118.

Figure 4A:
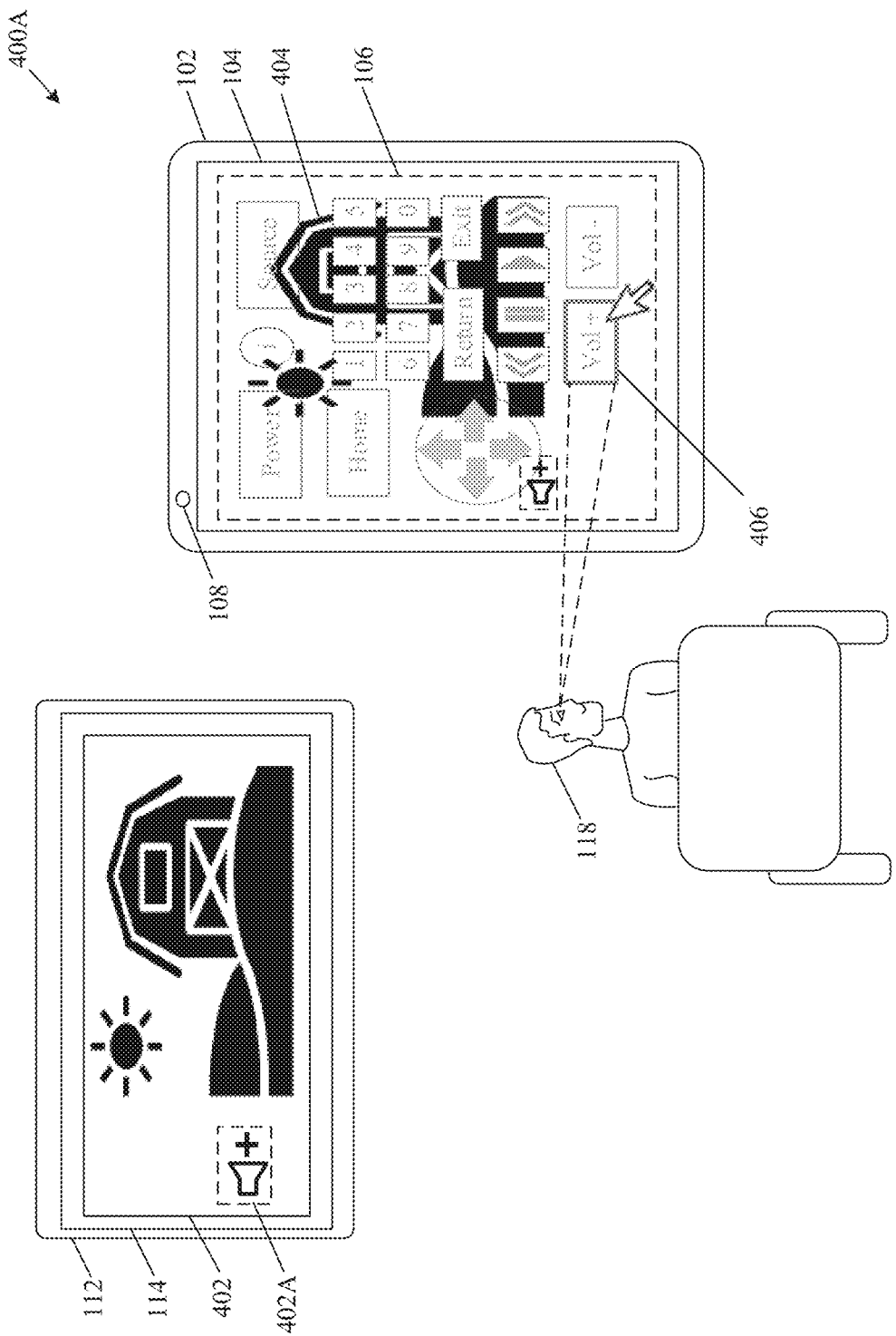
FIGS. 4A and 4B are diagrams which collectively illustrate other exemplary scenarios for control of the media display device of FIG. 1, in accordance with an embodiment of the disclosure.
Figure 4B:
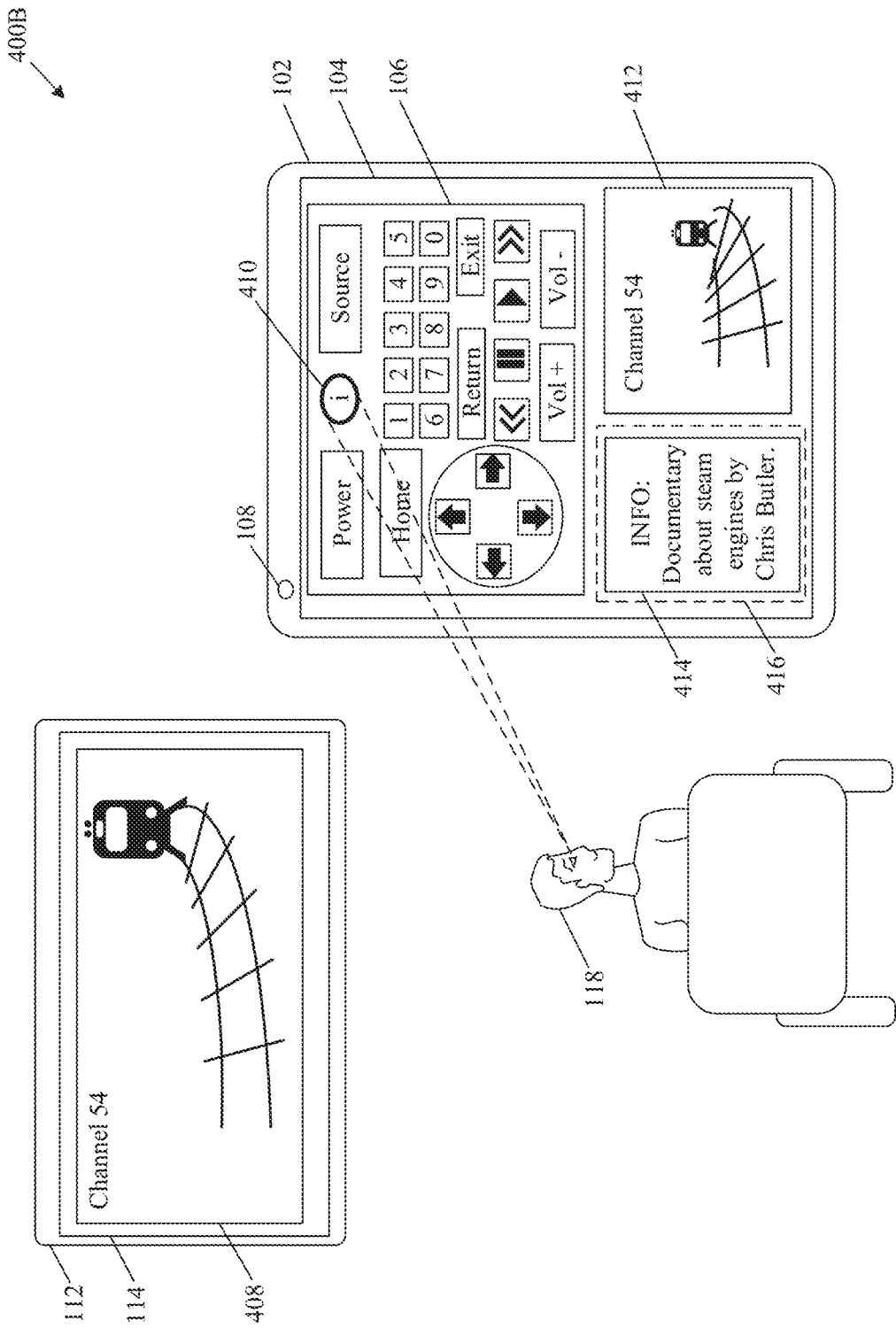

FIGS. 4A and 4B are diagrams which collectively illustrate other exemplary scenarios for control of the media display device 112 of FIG. 1, in accordance with an embodiment of the disclosure. FIGS. 4A and 4B are explained in conjunction with elements from FIGS. 1 and 2. With reference to FIG. 4A, there is shown an exemplary scenario 400A. In the exemplary scenario 400A, there is shown a media content 402, a feedback image 404, and a first UI element 406 (such as a "volume up" UI element). It may be noted that the function of the first UI element 406 (such as the "volume up" UI element) may be same as the function of the "volume up" UI element (shown as the first UI element 306) described, for example, in FIG. 3A.

The circuitry 202 may determine the position of the eye gaze of the user 118 on the first UI element 406 (such as the "volume up" UI element) of the plurality of UI elements 106. The circuitry 202 may further transmit the first control signal to control the volume of the media content 402, based on the determination of the position of the eye gaze of the user 118 on the first UI element 406 (such as the "volume up" UI element). Moreover, the circuitry 202 may receive the feedback image 404 from the media display device 112, such that the feedback image 404 may include an image of the "volume up" UI icon 402a overlaid on the media content 402 as shown in FIG. 4A.

In accordance with an embodiment, the circuitry 202 of the electronic device 102 may control the overlay of the displayed plurality of UI elements 106 on the displayed feedback image 404. The circuitry 202 may control the first display screen 104 to display the plurality of UI elements 106 over the feedback image 404 on a same portion of the first display screen 104 of the electronic device 102, as shown in FIG. 4A.

In one or more embodiments, the circuitry 202 may control the opacity level of the displayed plurality of UI elements 106 that are overlaid on the displayed feedback image 404. The circuitry 202 may, for example, decrease an amount of the opacity level of the displayed plurality of UI elements 106, such that the media content 402 of the received feedback image 404 may be easily viewable through the displayed plurality of UI elements 106. For example, the opacity level of the displayed plurality of UI elements 106 may be reduced to a level of 40% opacity, such that display of the media content 402 of the feedback image 404 may be visible to the user 118. Such an arrangement of the plurality of UI elements 106 with the reduced opacity level overlaid on the feedback image 404 may allow the user 118 to view the feedback image 404 concurrently with the plurality of UI elements 106, while controlling the media display device 112 via the eye gaze of the user 118. Moreover, such arrangement may provide the user 118 to view the plurality of UI elements 106 as well as the feedback image 404 on a full screen (or on a particular portion) of the first display screen 104. In an alternate embodiment, the plurality of UI elements 106 may be overlaid on the feedback image 404, such that the opacity level of the feedback image 404 is controlled (for example, reduced) instead of the control of the opacity level of the plurality of UI elements 106. The electronic device 102 thus allows the user to control the media display device 112, while continuously viewing the media content 402 on the electronic device 102, due to concurrent display of the feedback image 404 and the plurality of UI elements 106 on the electronic device 102.

With reference to FIG. 4B, there is shown an exemplary scenario 400B. In the exemplary scenario 400B, there is shown a media content 408, an "information" UI element 410 (such as the first UI element) of the plurality of UI elements 106, a feedback image 412, first information 414, and a third portion 416 of the first display screen 104 of the electronic device 102.

In some embodiments, the user 118 may require information about the media content, for example, the media content 408 rendered on the media display device 112. For example, the media display device 112 may render a documentary as the media content 408. The user 118 may require information about content of the documentary, for example, a name or summary of the documentary, and move the position of the eye gaze on the "information" UI element 410 (i.e. the first UI element) of the plurality of UI elements 106. In such a case, the circuitry 202 may determine the position of the eye gaze of the user 118 on the "information" UI element 410.

The circuitry 202 may further select the "information" UI element 410 of the plurality of UI elements 106, based on the determination of the position of the eye gaze of the user 118 on the "information" UI element 410. As a result, the circuitry 202 may transmit the first control signal to the media display device 112 to receive the information, for example, the first information 414, related to the media content 408 displayed on the media display device 112. In an example, the first information 414 may be the information about the documentary rendered on the media display device 112. In an embodiment, the circuitry 202 may further receive the feedback image, for example, the feedback image 412 corresponding to the media content 408 with the first information 414 from the media display device 112. In some embodiments, the circuitry 202 may receive the first information 414 related to the media content 408 from the server 120 (shown in FIG. 1).

In accordance with an embodiment, the circuitry 202 may be configured to control the first display screen 104 to display the information, for example, the first information 414, related to the media content 408 displayed on the second display screen 114 of the media display device 112. The circuitry 202 may control the first display screen 104 to display the first information 414, based on the selection of the "information" UI element 410 of the plurality of UI elements 106 by the eye gaze of user 118. In an embodiment, the circuitry 202 may display the first information 414 on the third portion 416 (i.e. different from the first portion 310 and the second portion 312 shown in FIG. 3A) of the first display screen 104. Furthermore, the circuitry 202 may further control the first display screen 104 to display the feedback image 412 on the first display screen 104 of the electronic device 102. It may be noted here that a position of the third portion 416 on the first display screen 104 shown in FIG. 4B is presented merely as an example. The present disclosure may be also applicable to other positions of the third portion 416 on the first display screen 104, without deviation from the scope of the disclosure.

In one or more embodiments, the plurality of UI elements 106, the feedback image 412, and the first information 414 may be displayed on three different portions of the first display screen 104. In an exemplary embodiment, the display positions of the plurality of UI elements 106, the feedback image 412, and the first information 414 may be preset. In another exemplary embodiment, the display positions of the plurality of UI elements 106, the feedback image 412, and the first information 414 may be set based on user input. In an exemplary embodiment, the plurality of UI elements 106 may be overlaid on the feedback image 412 and the first information 414, such that the plurality of UI elements 106 may be displayed with the controlled opacity level, for example, a reduced opacity level over the feedback image 412 and the first information 414, as described with reference to FIG. 4A.

Figure 5A:
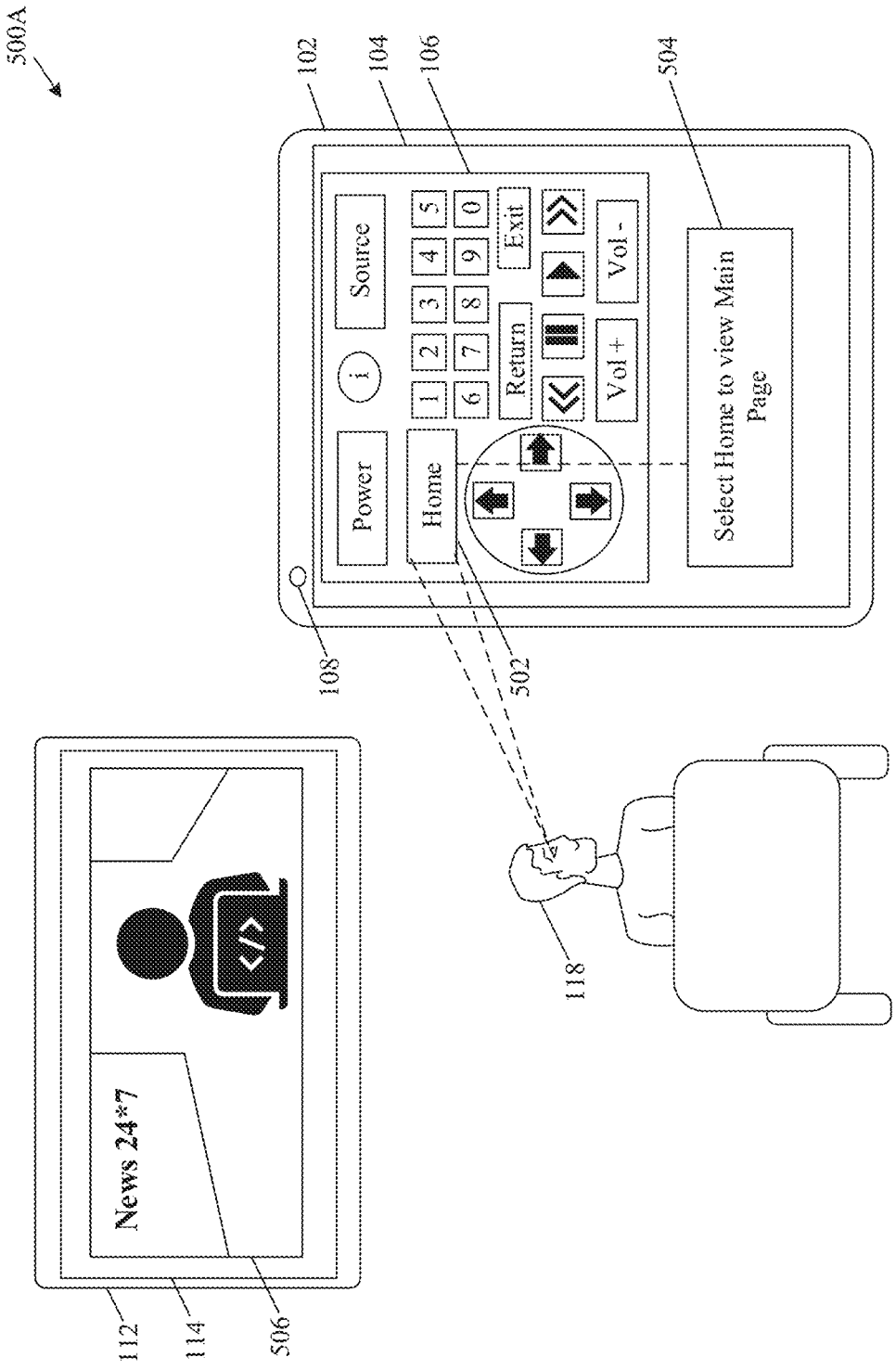
FIGS. 5A and 5B are diagrams which collectively illustrate other exemplary scenarios for control of the media display device of FIG. 1, in accordance with an embodiment of the disclosure.
Figure 5B:
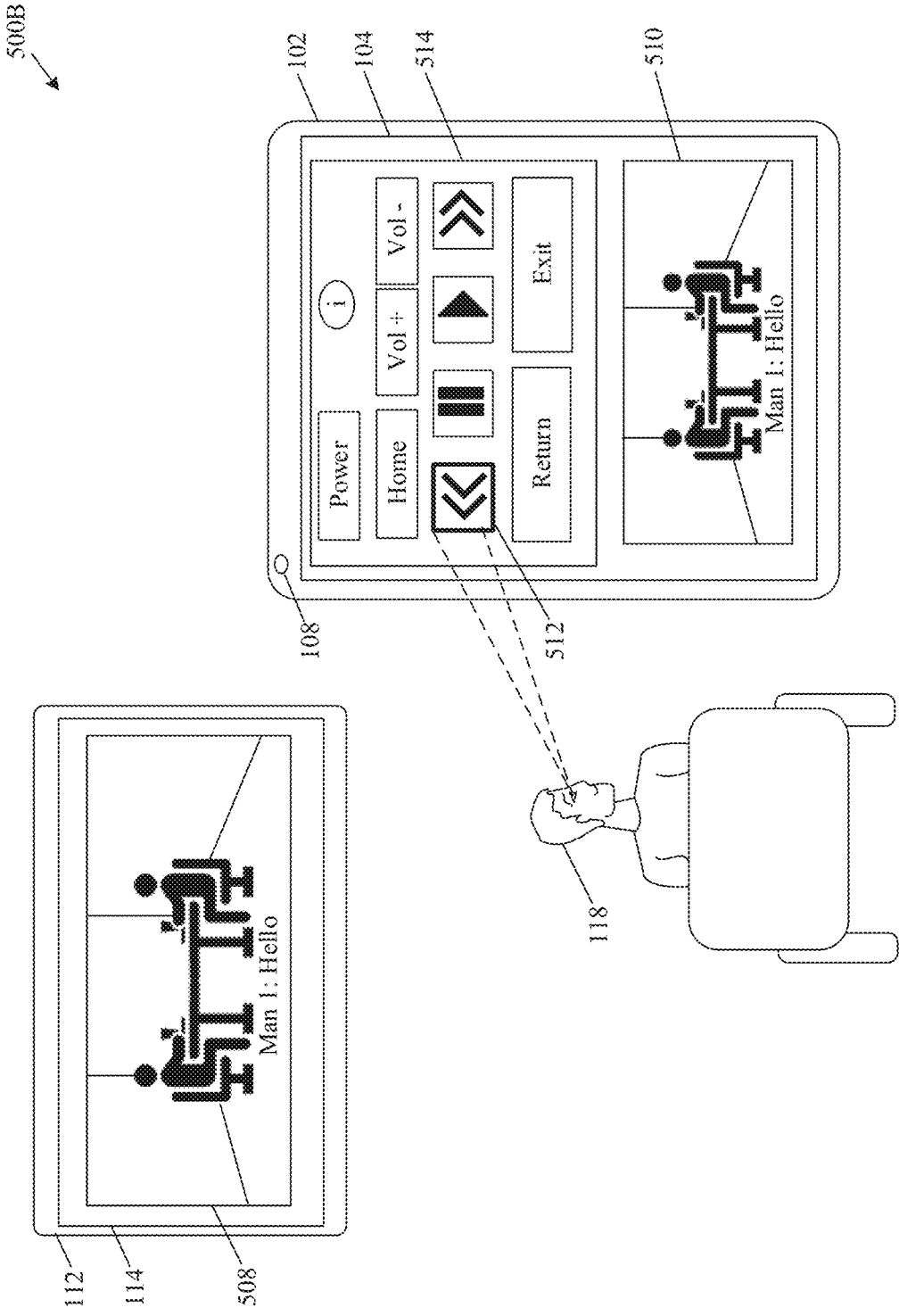

FIGS. 5A and 5B are diagrams which collectively illustrate other exemplary scenarios for control of the media display device 112 of FIG. 1, in accordance with an embodiment of the disclosure. FIGS. 5A and 5B are explained in conjunction with elements from FIGS. 1 and 2. With reference to FIG. 5A, there is shown an exemplary scenario 500A. In the exemplary scenario 500A, there is shown a "home" UI element 502 (i.e. first UI element) of the plurality of UI elements 106, guidance information 504, and media content 506. The media content 506 may relate to a content related to news rendered on the media display device 112, as shown in FIG. 5A.

In accordance with an embodiment, the media display device 112 may render the media content 506 (for example, news content). The user 118 may require viewing the home screen of the media display device 112 to switch to another media content on the media display device 112, and may further gaze at the "home" UI element 502. The circuitry 202 of the electronic device 102 may be configured to render the guidance information 504 (for example, information about the operation of the UI element such as "home" UI element 502) for the user 118 to view the home screen (for example, a main page) of the media display device 112, based on the determination of the position of the eye gaze of the user 118 on the "home" UI element 502 of the plurality of UI elements 106. Thus, circuitry 202 may select the "home" UI element 502 based on the eye gaze of the user 118 on the "home" UI element 502 to display the home screen (not shown in FIG. 5A) on the second display screen 114 of the media display device 112. Furthermore, the guidance information 504 may be rendered to control one or more configuration settings of the media display device 112 through one or more UI elements of the plurality of UI elements 106 displayed on the first display screen 104. For example, the guidance information 504 may provide the user 118 with information to configure specific settings (for example, but not limited to, adjustment of color, adjustment of aspect ratio) of the media display device 112. In an embodiment, the plurality of UI elements 106 and the guidance information 504 may be provided at different portions of the first display screen 104 of the electronic device 102. It may be noted here that a position of the guidance information 504 on the first display screen 104 shown in FIG. 5A is presented merely as an example. The present disclosure may be also applicable to other positions of the guidance information 504 on the first display screen 104, without deviation from the scope of the disclosure.

In some embodiments, the circuitry 202 may be configured to render the guidance information 504 for the user 118 by determination of the eye gaze of the user 118 on the "information" UI element 410 (shown in FIG. 4B). In an exemplary embodiment, the first information 414 of FIG. 4B may be the information about the operation of each UI element of the plurality of UI elements 106 or the information about the media content 506 currently rendered on the media display device 112. Thus, the guidance information 504 may assist the user 118 to select an appropriate UI element to control the one or more configuration settings or different functionalities of the media display device 112.

With reference to FIG. 5B, there is shown an exemplary scenario 500B. In the exemplary scenario 500B, there is shown media content 508, a feedback image 510, and a "playback control" UI element (for example, "rewind" UI element 512) of the plurality of UI elements 106. The media content 508 may include a movie rendered on the media display device 112.

In accordance with an embodiment, the media display device 112 may render the media content 508, for example, a movie. The circuitry 202 of the electronic device 102 may be configured to control the first display screen 104 to display a set of UI elements 514 (i.e. which may be a subset of the plurality of UI elements 106 on the first display screen 104 of FIG. 5A), based on the received feedback image 510. For example, the set of UI elements 514 may include a "power" UI element, a "home" UI element, an "information" UI element, a "volume up" UI element, a "volume down" UI element, the "rewind" UI element 512, a "pause" UI element, a "play" UI element, and a "forward" UI element as shown in FIG. 5B. The set of UI elements 514 may be displayed based on a type of media content 508 displayed on the media display device 112 and the feedback image 510 received by the electronic device 102. The circuitry 202 may further hide or omit unessential UI elements from the plurality of UI elements 106 based on the rendered media content 508, such that the screen real estate of the first display screen 104 in FIG. 5B is relatively less cluttered compared to the first display screen 104 of FIG. 5A. As a result, the circuitry 202 may efficiently determine the position of the eye gaze of the user 118 on any particular UI element (i.e. first UI element) of the set of UI elements 514. In an example, the circuitry 202 may hide or omit UI elements such as the "navigation" UI elements, the "numeric" UI elements, and so forth, during the playback of the movie. As shown in FIG. 5B, the circuitry 202 may control the first display screen 104 to display the set of UI elements 514 that may be required by the user 118 to control playback of the media content 508 (for example, the movie) on the media display device 112.

In an exemplary embodiment, the user 118 may require rewinding the media content 508 rendered on the media display device 112. The circuitry 202 may further determine the position of the eye gaze of the user 118 on the "rewind" UI element 512 (i.e. first UI element) of the set of UI elements 514 for a certain time interval (for example for few seconds). The circuitry 202 may select the "rewind" UI element 512, based on the determination of the eye gaze of the user 118 on the "rewind" UI element 512. The circuitry 202 may further transmit the first control signal to the media display device 112 to rewind the media content 508 on the media display device 112 based on the eye gaze as the user input. Further, the circuitry 202 may receive the feedback image 510, including an image of the media content 508, from the media display device 112, based on the transmitted first control signal. The set of UI elements 514 and the feedback image 510 may be displayed on different portions of the first display screen 104. In some embodiments, the set of UI elements 514 may be overlaid on the feedback image 510 on the first display screen 104. Therefore, the circuitry 202 may allow the user 118 to efficiently control the rendering of the media content 508 on the media display device 112, by using the set of UI elements 514. It may be noted that the set of UI elements 514 shown in FIG. 5B are presented merely as an example. The present disclosure may be also applicable to other set of UI elements on the first display screen 104, without deviation from the scope of the disclosure.

Figure 6:
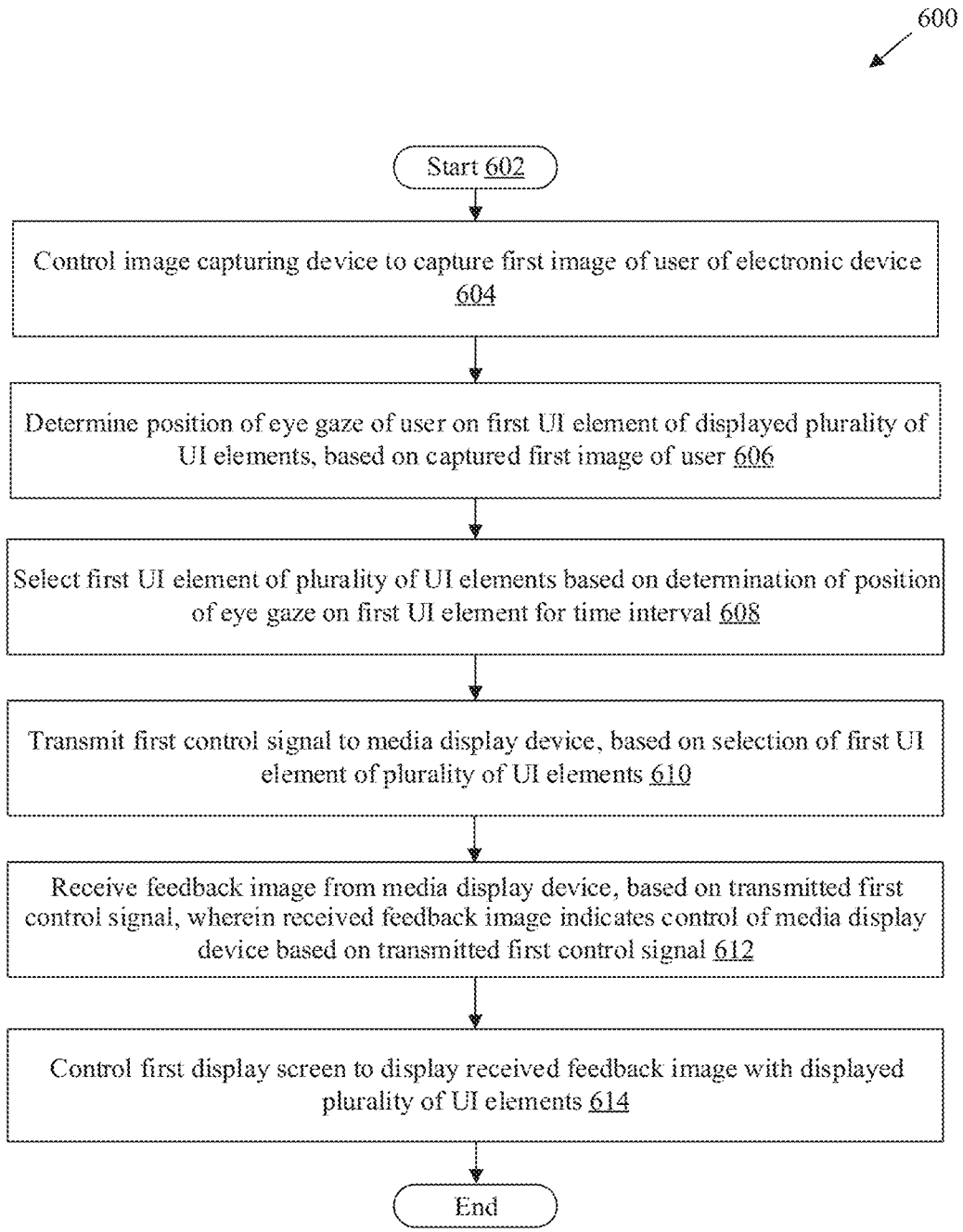
FIG. 6 is a flowchart that illustrates an exemplary method for control of the media display device based on the eye gaze as user input, in accordance with an embodiment of the disclosure.

FIG. 6 is a flowchart that illustrates an exemplary method for control of the media display device, via the electronic device, in accordance with an embodiment of the disclosure. FIG. 6 is described in conjunction with elements from FIGS.

1, 2, 3A, 3B, 4A, 4B, 5A, and 5B. With reference to FIG. 6, there is shown a flowchart 600. The operations of the flowchart 600 may be executed by a computing system, such as the electronic device 102 or the circuitry 202. The operations may start at 602 and proceed to 604.

At 604, the image capturing device 108 may be controlled to capture a first image of a user of the electronic device 102. In one or more embodiments, the circuitry 202 of the electronic device 102 may be configured to control the image capturing device 108 of the electronic device 102 to capture the first image of the user 118 of the electronic device 102 as described, for example, in FIG. 3A.

At 606, a position of an eye gaze of the user 118 may be determined on a first UI element of the displayed plurality of UI elements, based on the captured first image of the user 118. In one or more embodiments, the circuitry 202 of the electronic device 102 may be configured to determine the position of the eye gaze of the user 118 on the first UI element 106A of the displayed plurality of UI elements 106, based on the captured first image of the user 118 as described, for example, in FIG. 3A.

At 608, the first UI element 106A of the plurality of UI elements 106 may be selected based on the determination of the position of the eye gaze on the first UI element 106A for a time interval. In one or more embodiments, the circuitry 202 of the electronic device 102 may be configured to select the first UI element 106A of the plurality of UI elements 106 based on the determination of the position of the eye gaze on the first UI element 106A for the time interval as described, for example, in FIG. 3A. In some embodiments, the time interval may be a few seconds (such as at least 3 seconds).

At 610, a first control signal may be transmitted to the media display device 112, based on the selection of the first UI element 106A of the plurality of UI elements 106. In one or more embodiments, the circuitry 202 of the electronic device 102 may be configured to transmit the first control signal to the media display device 112, based on the selection of the first UI element 106A of the plurality of UI elements 106 as described, for example, in FIG. 3A.

At 612, a feedback image may be received from the media display device 112, based on the transmitted first control signal. In one or more embodiments, the circuitry 202 of the electronic device 102 may be configured to receive the feedback image 304 from the media display device 112, based on the transmitted first control signal as described, for example, in FIG. 3A. The received feedback image 304 may indicate the control of the media display device 112 based on the transmitted first control signal.

At 614, a first display screen may be controlled to display the received feedback image 304 with the displayed plurality of UI elements 106. In one or more embodiments, the circuitry 202 of the electronic device 102 may be configured to control the first display screen 104 to display the received feedback image 304 with the displayed plurality of UI elements 106 as described, for example, in FIG. 3A. The control may pass to end.

Although the flowchart 600 is illustrated as discrete operations, such as 604, 606, 608, 610, 612, and 614, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by an electronic device (the electronic device 102) which includes an image capturing device (such as the image capturing device 108) and a first display screen (such as the first display screen 104), causes the electronic device 102 to execute operations. The operations may include control of the first display screen to display a plurality of user interface (UI) elements. A selection of each of the plurality of UI elements controls a media display device (such as the media display device 112) communicably coupled to the electronic device. The operations further include control of the image capturing device to capture a first image of a user of the electronic device. The operations further include determination of a position of an eye gaze of the user on a first UI element of the displayed plurality of UI elements, based on the captured first image of the user. The operations further include selection of the first UI element of the plurality of UI elements based on the determination of the position of the eye gaze on the first UI element for a time interval. The operations further include transmission of a first control signal to the media display device, based on the selection of the first UI element of the plurality of UI elements. The operations further include reception of a feedback image from the media display device, based on the transmitted first control signal. The received feedback image indicates the control of the media display device based on the transmitted first control signal. The operations further include control of the first display screen to display the received feedback image with the displayed plurality of UI elements.

Exemplary aspects of the disclosure may include an electronic device (such as the electronic device 102). The electronic device 102 may include an image capturing device (such as the image capturing device 108) and a first display screen (such as the first display screen 104) that may be configured to display a plurality of user interface (UI) elements (such as the plurality of UI elements 106). A selection of each of the plurality of UI elements 106 may control a media display device (such as the media display device 112) communicably coupled to the electronic device 102. The electronic device 102 may further include circuitry (such as the circuitry 202) coupled to the image capturing device 108 and the first display screen 104. The circuitry 202 may be configured to control the image capturing device 108 to capture a first image of a user (for example, the user 118) of the electronic device 102. The circuitry 202 may be further configured to determine a position of an eye gaze of the user 118 on a first UI element (for example the first UI element 106A) of the displayed plurality of UI elements 106, based on the captured first image of the user 118. The circuitry 202 may be further configured to select the first UI element 106A of the plurality of UI elements 106 based on the determination of the position of the eye gaze on the first UI element 106A for a time interval. The circuitry 202 may be further configured to transmit a first control signal to the media display device 112, based on the selection of the first UI element 106A of the plurality of UI elements 106. The circuitry 202 may be further configured to receive a feedback image (for example, the feedback image 110) from the media display device 112, based on the transmitted first control signal. The received feedback image 110 may indicate the control of the media display device 112 based on the transmitted first control signal. The circuitry 202 may be further configured to control the first display screen 104 to display the received feedback image 110 with the displayed plurality of UI elements 106.

In accordance with an embodiment, each UI element of the plurality of UI elements 106 may be associated with a different functionality associated with the media display device 112.

In accordance with an embodiment, the circuitry 202 may be further configured to control a movement of a cursor (such as the cursor 308) on the plurality of UI elements 106 corresponding to a change in the position of the eye gaze of the user 118 on the plurality of UI elements 106.

In accordance with an embodiment, the circuitry 202 may be further configured to highlight the first UI element 106A based on the selection of the first UI element 106A of the plurality of UI elements 106.

In accordance with an embodiment, the feedback image 304 received from the media display device 112 may correspond to a UI icon (such as the UI icon 302a) to indicate the control of the media display device 112 based on the transmitted first control signal.

In accordance with an embodiment, the feedback image 316 received from the media display device 112 may correspond to media content (such as the media content 314) displayed on a second display screen (such as the second display screen 114) of the media display device 112 based on the transmitted first control signal.

In accordance with an embodiment, the circuitry 202 may be further configured to control an overlay of the displayed plurality of UI elements 106 on the displayed feedback image 404 that may correspond to the media content 402 displayed on the second display screen 114 of the media display device 112.

In accordance with an embodiment, the circuitry 202 may be further configured to control an opacity level of the displayed plurality of UI elements 106 that are overlaid on the displayed feedback image 404.

In accordance with an embodiment, the circuitry 202 may be further configured to control the first display screen 104 to display information (such as the first information 414), related to the media content 408 displayed on the second display screen 114 of the media display device 112, based on a selection of one or more UI elements of the plurality of UI elements 106.

In accordance with an embodiment, the circuitry 202 may be further configured to control the first display screen 104 to display the plurality of UI elements 106 on a first portion (such as the first portion 310) of the first display screen 104, and display the received feedback image 304 on a second portion (such as the second portion 312) of the first display screen 104. The first portion 310 may be different from the second portion 312.

In accordance with an embodiment, the circuitry 202 may be further configured to determine at least one of a gesture associated with facial expression of the user 118 or a gesture associated with a head of the user 118, to select the first UI element 106A of the plurality of UI elements 106 displayed on the first display screen 104.

In accordance with an embodiment, the circuitry 202 may be further configured to render guidance information (for example, the guidance information 504) for the user 118, to control one or more configuration settings of the media display device 112 through one or more UI elements of the plurality of UI elements 106 displayed on the first display screen 104.

In accordance with an embodiment, the circuitry 202 may be further configured to control the first display screen 104 to display a set of UI elements 514 of the plurality of UI elements 106 on the first display screen 104, based on the received feedback image 510.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   an image capturing device;
   a first display screen configured to
      display a plurality of user interface (UI) elements, wherein a selection of each of the plurality of UI elements controls a media display device communicably coupled to the electronic device; and
   circuitry coupled to the image capturing device and the first display screen, wherein the circuitry is configured to:
      control the image capturing device to capture a first image of a user of the electronic device;
      determine a position of an eye gaze of the user on a first UI element of the displayed plurality of UI elements, based on the captured first image of the user;
      select the first UI element of the plurality of UI elements based on the determination of the position of the eye gaze on the first UI element for a time interval;
      transmit a first control signal to the media display device, based on the selection of the first UI element of the plurality of UI elements;
      receive a feedback image from the media display device, based on the transmitted first control signal, wherein
         the received feedback image indicates the control of the media display device based on the transmitted first control signal, the received feedback image corresponds to media content displayed on a second display screen of the media display device, and the received feedback image includes an image of an icon of the selected first UI element;

control the first display screen to display the received feedback image;

control the first display screen to display a subset of UI elements of the plurality of UI elements based on a type of the media content of the received feedback image;

control an overlay of the displayed subset of UI elements on the displayed feedback image that includes the image of the icon of the selected first UI element;

determine the position of the eye gaze of the user on a second UI element of the displayed subset of UI elements;

select the second UI element from the displayed subset of UI elements based on the determination of the position of the eye gaze on the second UI element; and control, based on the selection of the second UI element, the first display screen to display information related to the media content displayed on the second display screen, wherein the information related to the media content displayed on the second display screen includes at least one of a name or a summary of the displayed media content.

2. The electronic device according to claim 1, wherein each UI element of the plurality of UI elements is associated with a different functionality associated with the media display device.

3. The electronic device according to claim 1, wherein the circuitry is further configured to control a movement of a cursor on the plurality of UI elements corresponding to a change in the position of the eye gaze of the user on the plurality of UI elements.

4. The electronic device according to claim 1, wherein the circuitry is further configured to highlight the first UI element based on the selection of the first UI element of the plurality of UI elements.

5. The electronic device according to claim 1, wherein the feedback image received from the media display device corresponds to a UI icon to indicate the control of the media display device based on the transmitted first control signal.

6. The electronic device according to claim 1, wherein the circuitry is further configured to control an opacity level of the displayed subset of UI elements that are overlaid on the displayed feedback image including the image of the icon of the selected first UI element.

7. The electronic device according to claim 1, wherein the circuitry is further configured to:

control the first display screen to display the plurality of UI elements on a first portion of the first display screen; and control the first display screen to display the received feedback image on a second portion of the first display screen, wherein the first portion is different from the second portion.

8. The electronic device according to claim 7, wherein the circuitry is further configured to control the first display screen to display the information, related to the media content displayed on the second display screen, on a third portion of the first display screen, and the third portion is different from the first portion and the second portion.

9. The electronic device according to claim 1, wherein the circuitry is further configured to determine at least one of a gesture associated with facial expression of the user or a gesture associated with a head of the user, to select the first UI element of the plurality of UI elements displayed on the first display screen.

10. The electronic device according to claim 1, wherein the circuitry is further configured to render guidance information for the user, to control at least one configuration setting of the media display device through at least one UI element of the plurality of UI elements displayed on the first display screen.

11. A method, comprising:

in an electronic device which includes:
an image capturing device, and
a first display screen configured to display a plurality of user interface (UI) elements, wherein a selection of each of the plurality of UI elements controls a media display device communicably coupled to the electronic device:

controlling the image capturing device to capture a first image of a user of the electronic device;

determining a position of an eye gaze of the user on a first UI element of the displayed plurality of UI elements, based on the captured first image of the user;

selecting the first UI element of the plurality of UI elements based on the determination of the position of the eye gaze on the first UI element for a time interval;

transmitting a first control signal to the media display device, based on the selection of the first UI element of the plurality of UI elements;

receiving a feedback image from the media display device, based on the transmitted first control signal, wherein the received feedback image indicates the control of the media display device based on the transmitted first control signal, the received feedback image received from the media display device corresponds to media content displayed on a second display screen of the media display device, and the received feedback image includes an image of an icon of the selected first UI element;

controlling the first display screen to display the received feedback image;

controlling the first display screen to display a subset of UI elements of the plurality of UI elements based on a type of the media content of the received feedback image;

controlling an overlay of the displayed subset of UI elements on the displayed feedback image that includes the image of the icon of the selected first UI element;

determining the position of the eye gaze of the user on a second UI element of the displayed subset of UI elements;

selecting the second UI element from the displayed subset of UI element based on the determination of the position of the eye gaze on the second UI element; and controlling, based on the selection of the second UI element, the first display screen to display information related to the media content displayed on the second display screen, wherein the information related to the media content displayed on the second display screen includes at least one of a name or a summary of the displayed media content.

12. The method according to claim 11, further comprising controlling a movement of a cursor on the plurality of UI elements corresponding to a change in the position of the eye gaze of the user on the plurality of UI elements.

13. The method according to claim 11, further comprising controlling an opacity level of the displayed subset of UI elements that are overlaid on the displayed feedback image including the image of the icon of the selected first UI element.

14. The method according to claim 11, further comprising:
- controlling the first display screen to display the plurality of UI elements on a first portion of the first display screen; and
- controlling the first display screen to display the received feedback image on a second portion of the first display screen, wherein the first portion is different from the second portion.

15. A non-transitory computer-readable medium having stored thereon, computer-executable instructions that when executed by an electronic device which includes an image capturing device and a first display screen, causes the electronic device to execute operations, the operations comprising:
- controlling the first display screen to display a plurality of user interface (UI) elements, wherein a selection of each of the plurality of UI elements controls a media display device communicably coupled to the electronic device;
- controlling the image capturing device to capture a first image of a user of the electronic device;
- determining a position of an eye gaze of the user on a first UI element of the displayed plurality of UI elements, based on the captured first image of the user;
- selecting the first UI element of the plurality of UI elements based on the determination of the position of the eye gaze on the first UI element for a time interval;
- transmitting a first control signal to the media display device, based on the selection of the first UI element of the plurality of UI elements;
- receiving a feedback image from the media display device, based on the transmitted first control signal, wherein
  - the received feedback image indicates the control of the media display device based on the transmitted first control signal,
  - the received feedback image received from the media display device corresponds to media content displayed on a second display screen of the media display device, and
  - the received feedback image includes an image of an icon of the selected first UI element;
- controlling the first display screen to display the received feedback image;
- controlling the first display screen to display a subset of UI elements of the plurality of UI elements based on a type of the media content of the received feedback image;
- controlling an overlay of the displayed subset of UI elements on the displayed feedback image that includes the image of the icon of the selected first UI element;
- determining the position of the eye gaze of the user on a second UI element of the displayed subset of UI elements;
- selecting the second UI element from the displayed subset of UI elements based on the determination of the position of the eye gaze on the second UI element; and
- controlling, based on the selection of the second UI element, the first display screen to display information related to the media content displayed on the second display screen,
  - wherein the information related to the media content displayed on the second display screen includes at least one of a name or a summary of the displayed media content.

\* \* \* \* \*